United States Patent
Ishitsuka et al.

[11] Patent Number: 6,060,180
[45] Date of Patent: May 9, 2000

[54] ALLOY HAVING HIGH CORROSION RESISTANCE IN ENVIRONMENT OF HIGH CORROSIVENESS, STEEL PIPE OF THE SAME ALLOY AND METHOD OF MANUFACTURING THE SAME STEEL PIPE

[75] Inventors: Tetsuo Ishitsuka; Koichi Nose, both of Futtsu, Japan

[73] Assignee: Nippon Steel Corporation, Tokyo, Japan

[21] Appl. No.: 08/973,356

[22] PCT Filed: Apr. 15, 1997

[86] PCT No.: PCT/JP97/01302

§ 371 Date: Dec. 2, 1997

§ 102(e) Date: Dec. 2, 1997

[87] PCT Pub. No.: WO97/39153

PCT Pub. Date: Oct. 23, 1997

[30] Foreign Application Priority Data

| Apr. 16, 1996 | [JP] | Japan | 8-094547 |
| Jul. 23, 1996 | [JP] | Japan | 8-193758 |
| Jan. 20, 1997 | [JP] | Japan | 9-008106 |

[51] Int. Cl.$^7$ ............ B32B 15/18; C22C 38/40; C21D 9/08

[52] U.S. Cl. ............ 428/683; 148/592; 148/593; 148/611; 148/621; 148/660; 420/50; 420/51; 420/52; 420/53; 420/586.1; 138/143; 428/685

[58] Field of Search ............ 428/636, 637, 428/638, 683, 685, 668, 679; 138/143; 148/592, 593, 611, 621, 660; 420/43, 50, 51, 52, 53, 56, 57, 97, 98, 118, 586.1

[56] References Cited

U.S. PATENT DOCUMENTS

| 5,378,427 | 1/1995 | Otsuka et al. | 420/586.1 |
| 5,620,805 | 4/1997 | Ogawa et al. | 428/683 |

FOREIGN PATENT DOCUMENTS

| 58-177438 | 10/1983 | Japan . |
| 64-8695 | 2/1989 | Japan . |
| 4-350149 | 12/1992 | Japan . |
| 7-243007 | 9/1995 | Japan . |

OTHER PUBLICATIONS

Yoshiba, M. et al., "Hot Corrosion Behavior of Heat Resisting Alloys," Iron & Steel, vol. 67 (1981), pp. 156–165, No. 7.

Rapp, R., "Chemistry and Electrochemistry of the Hot Corrosion of Metals," Corrosion, vol. 42, No. 10, Oct. 1986, pp. 568–577.

Primary Examiner—Deborah Jones
Assistant Examiner—Robert R. Koehler
Attorney, Agent, or Firm—Kenyon & Kenyon

[57] ABSTRACT

The present invention provides a highly corrosion-resistant alloy used as a boiler tube in equipment the energy source of which is obtained by burning fossil fuel or waste, a steel tube for which the alloy is used, and a process for producing the steel tube. The alloy comprises up to 0.05% of C, 1.0 to 2.6% of Si, 0.02 to 1.0% of Mn, 20.0 to 28.0% of Cr, 18.0 to 30.0% of Ni, up to 4.0% of Mo, up to 0.05% of Al, 0.05 to 0.30% of N and the balance Fe and unavoidable impurities. Furthermore, the present invention also provides a multilayer steel tube having the alloy as a liner material and a standardized boiler tube as a base layer material, and a process for producing the multilayer steel tube.

7 Claims, 4 Drawing Sheets

ALLOY HAVING HIGH CORROSION RESISTANCE IN ENVIRONMENT OF HIGH CORROSIVENESS, STEEL PIPE OF THE SAME ALLOY AND METHOD OF MANUFACTURING THE SAME STEEL PIPE

FIELD OF THE INVENTION

The present invention relates to an alloy and a steel tube used as a heat exchanger tube in an extremely corrosive environment such as a boiler environment where fuels such as crude oil, heavy oil, tar or coal which are of poor quality and contain Na, S and Cl are burnt, and an environment where waste such as industrial waste, municipal refuse or sewage sludge is burnt, and a process for producing the same. The present invention particularly relates to an austenitic alloy, for boilers, highly corrosion-resistant to strongly corrosive combustion ash adhering to a steel tube for a boiler installed for power generation by the use of incineration waste heat and simultaneously containing sulfates and chlorides, a steel tube produced therefrom, and a process for producing the steel tube.

BACKGROUND OF THE INVENTION

In equipment such as a thermal power station where fossil fuel or waste is used as an energy source by burning, when fuel such as tar, coal or heavy oil of poor quality is used, or when plastics or waste including a great deal of salt is used as fuel, the combustion products of such fuel, etc. often contain a great deal of Na, K, S and Cl. Low melting point compounds containing sulfates and chlorides such as $Na_2SO_4$, NaCl, KCl and $CaSO_4$ are formed on the surface of furnace wall tubes, steam superheater tubes, etc. of power generation equipment or combustion equipment. Consequently, scale formed on the tube surface melts to produce hot corrosion. Long term use of the furnace wall tubes and steam superheater tubes thus results in their destruction.

Furthermore, in a coal burning boiler, or waste incineration equipment or thermal power station of fluidized bed furnace type, hot erosion caused by combustion ash and fluid sand is produced on the surface of steam superheater tubes, etc., and accelerates hot corrosion.

The literature on related techniques (e.g., Corrosion, 42, 568 (1986); Iron and Steel, 67, 996 (1981)) illustrates that alloy components such as Cr have a corrosion resistance to a certain degree to such types of corrosion, particularly to coal ash corrosion characterized by sulfate corrosion. Moreover, Japanese Unexamined Patent Publication (Kokai) No. 58-177438 discloses an austenitic stainless steel having an improved high temperature corrosion resistance.

For high temperature corrosion in a chloride environment, Japanese Examined Patent Publication (Kokoku) No. 64-8695 discloses that alloying components such as Mo, W and V are effective for cooking electrical appliances in an environment where foods containing chlorides are heated. The Patent Publication also suggests that the alloy is also suited to a steel tube for an incineration boiler used in a NaCl-containing environment. However, a boiler tube is required to have a certain strength as a pressure-resistant member, and notwithstanding the constituent system of the alloy in which an embrittlement phase such as the σ-phase is extremely liable to precipitate, no concrete countermeasures have ever been shown. In addition to this, the Si content in the examples is up to 1.3% although the upper limit of the content of Si which is thought to be extremely effective for corrosion resistance but which is thought to accelerate precipitation of the σ-phase is stipulated to be 2.0%.

The present inventors have heretofore proposed in Japanese Unexamined Patent Publication (Kokai) No. 7-243007 an alloy and a multilayer steel tube having corrosion resistance to a certain degree in an environment where hot corrosion is produced. However, since the alloy and the steel tube disclosed therein have a relatively high Ni content, they tend to show an increased corrosion amount in an environment where the concentration of sulfates is high. Moreover, the component conditions such as a Ni content are not necessarily preferable, and, therefore, a further improvement of the alloy and the steel tube is required.

DISCLOSURE OF THE INVENTION

An object of the present invention is to provide, at low cost, an alloy having high corrosion resistance and erosion resistance in a high temperature combustion environment where sulfates and chlorides such as $Na_2SO_4$ and NaCl exist simultaneously, a steel tube made of the alloy and a process for producing the steel tube.

To achieve the object, the present invention is intended to inhibit formation of δ ferrite, carbonitrides and the σ phase by mainly optimizing the addition amounts of Cr, Si, Mo, Ni, C and N, improve the corrosion resistance by insolubilizing a protective oxide film for corrosion-resistance to fused salts, and prevent σ phase embrittlement during the production of the steel tube by optimizing the heating temperature and cooling rates.

The aspects of the present invention are summarized as described below.

(1) An alloy having excellent corrosion resistance in an environment where fuel of poor quality and waste are burnt, the alloy comprising, in terms of weight, up to 0.05% of C, 1.0 to 2.6% of Si, 0.02 to 1.0% of Mn, 20.0 to 28.0% of Cr, 18.0 to 30.0% of Ni, up to 4.0% of Mo, up to 0.05% of Al, 0.05 to 0.30% of N and the balance Fe and unavoidable impurities, and satisfying the following formula:

$$(Cr+2Si+0.5Mo)>Ni \geq 1.1(Cr+1.5Si+0.5Mo)-8,$$

and $$Mo(Cr-18) \geq 8$$

(2) The alloy according to item (1) excellent in corrosion resistance in an environment where fuel of poor quality and waste are burnt, wherein the alloy comprises 0.10 to 0.30% of N in terms of weight.

(3) The alloy according to item (1) or (2) excellent in corrosion resistance in an environment where fuel of poor quality and waste are burnt, wherein the alloy comprises, in terms of weight, 0.02 to 0.05% of C, 1.60 to 2.2% of Si, 23.0 to 27.0% of Cr, 23.0 to 27.0% of Ni and 2.0 to 4.0% of Mo.

(4) The alloy according to any one of item (1) to (3) excellent in corrosion resistance in an environment where fuel of poor quality and waste are burnt, wherein the alloy further comprises up to 0.4% of Nb.

(5) A steel tube excellent in corrosion resistance in an environment where fuel of poor quality and waste are burnt, the steel tube comprising the alloy according to any one of item (1) to (4).

(6) A multilayer steel tube excellent in corrosion resistance in an environment where fuel of poor quality and waste are burnt, the multilayer steel tube comprising a standardized boiler tube (JIS G3461, G3462, G3463) as a base layer material, and an alloy according to any one of item (1) to (4) as an outer layer material.

(7) A process for producing a steel tube excellent in corrosion resistance in an environment where fuel of poor quality and waste are burnt, comprising the steps of heating a billet of an alloy according to any one of item (1) to (4) to temperatures of 1,200 to 1,250° C., elongating the billet by hot extrusion, and cooling the elongated product to 550° C. at a rate of at least 1° C./sec to form an austenite single phase structure.

BEST MODE FOR CARRYING OUT THE INVENTION

As the result of carrying out research on materials suited to a high temperature combustion environment where sulfates and chlorides such as $Na_2SO_4$, NaCl, KCl and $CaSO_4$ are formed during combustion and adhere to and deposit on oxidized scales, the present inventors have made the discoveries described below.

(i) In the high temperature combustion environment, the corrosion resistance of the alloy does not depend on the Cr content alone but on a combination of Ni, Co and Mo. That is, an alloy having a high Cr content generally has a corrosion resistance in a high temperature oxidizing atmosphere environment having a high $O_2$ concentration. However, in power generation equipment which uses crude oil, heavy oil, tar, coal, and the like as fuel and in refuse incineration power generation equipment, the $O_2$ concentration is decreased for the purpose of decreasing $No_x$. As a result, an alloy having a high Cr content does not necessarily have corrosion resistance.

(ii) In the high temperature combustion environment, since low melting point compounds such as an eutectic compound, for example, $NaCl$—$Na_2SO_4$—$KCl$—$K_2SO_4$ and $NaCl$—$KCl$—$CaSO_4$ are formed as scale on the alloy surface, fused scale is formed on the alloy surface. Consequently, scale on the alloy surface is locally fused, and protective scale disappears, which extraordinarily increases the corrosion rate. Moreover, hot erosion caused by fluid sand and coal ash increases the corrosion rate.

(iii) Local fusion of scale initially takes place as a result of dissolution of the alloy scale such as $Cr_2O_3$ in a fused liquid of the low melting compounds such as $NaCl$—$Na_2SO_4$—$KCl$—$K_2SO_4$ formed in the scale. Therefore, making the scale composition difficult to fuse in the fused liquid is effective in increasing the corrosion resistance of the alloy. In other words, it is necessary that the alloy compositions be determined so that scale having such a composition is formed.

(iv) The local fusion behavior of scale utterly differs between cases where the fused liquid formed in the adhering scale mainly contains sulfates and cases where the fused liquid formed therein mainly contains chlorides. Although $Cr_2O_3$ which is considered effective as a protective scale is difficult to dissolve in a fused liquid mainly containing sulfates, it tends to dissolve in a fused liquid mainly containing chlorides. Moreover, Mo accelerates dissolution of $Cr_2O_3$ in the fused liquid mainly containing sulfates, whereas it has an effect of inhibiting dissolution thereof in the fused liquid mainly containing chlorides. Since Ni forms a low melting point eutectic typically represented by Ni—$Ni_3S_2$ in the fused liquid mainly containing sulfates, addition of Ni in a large amount exerts adverse effects on the corrosion resistance. However, Ni is very excellent in corrosion resistance in the fused liquid mainly containing chlorides. As explained above, there are many elements which show opposite effects in a sulfate-containing fused liquid and a chloride-containing one. Particularly in a waste incineration environment where sulfates and chlorides are often contained equally, the combination of the range of chemical components advantageous to corrosion resistance is extremely restricted.

(v) Since $SiO_2$ is difficult to dissolve in fused liquids of both sulfates and chlorides, addition of Si in a large amount is extremely effective in improving the corrosion resistance. However, since Si is an element which extremely accelerates precipitation of the σ phase which is a brittle phase, addition of Si in a large amount becomes possible only by adding elements which inhibit precipitation of the σ phase, and optimizing the heating temperature and the cooling rate in the production process of the tube.

(vi) To impart hot erosion resistance to the alloy, it is necessary to strengthen the matrix and control the formation of giant precipitates. Particularly when carbonitrides are continuously precipitated at the grain boundaries, the fused scale selectively penetrates the carbonitrides to increase a corrosion amount. It is, therefore, necessary to inhibit grain boundary precipitation of the carbonitrides.

The present invention has been achieved based on the knowledge as mentioned above. In the present invention, the corrosion resistance of an alloy in a corrosive environment, particularly in a strongly corrosive environment, namely in an environment where dissolution of a protective scale is difficult to control has been investigated by taking the alloy composition into consideration.

The present invention has been intended to improve the corrosion resistance of the alloy by optimizing mainly the addition amounts of Cr, Si, Mo and Ni to inhibit the formation of δ ferrite, carbonnitrides and the σ phase, and insolubilizing a protective oxide film for corrosion-resistant into fused salts.

To design the alloy composition of the present invention, corrosion tests were conducted by simulating fused scale composed of low melting compounds formed on the alloy surface in an environment in which boiler tubes are used, namely in a high temperature combustion environment.

Figure 1:
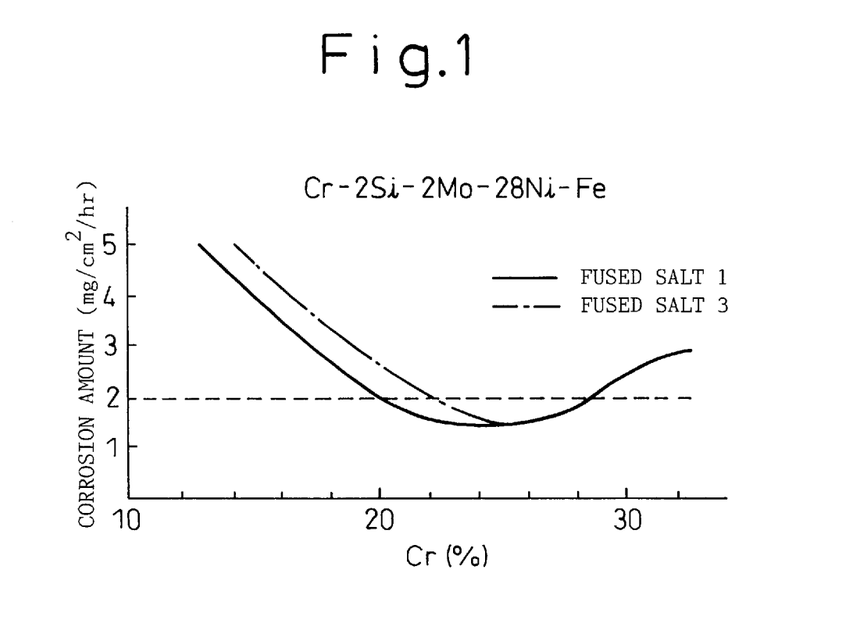
FIG. 1 is a graph showing the influence of the amount of Cr on the corrosion amount in a fused scale simulation environment.
Figure 2:
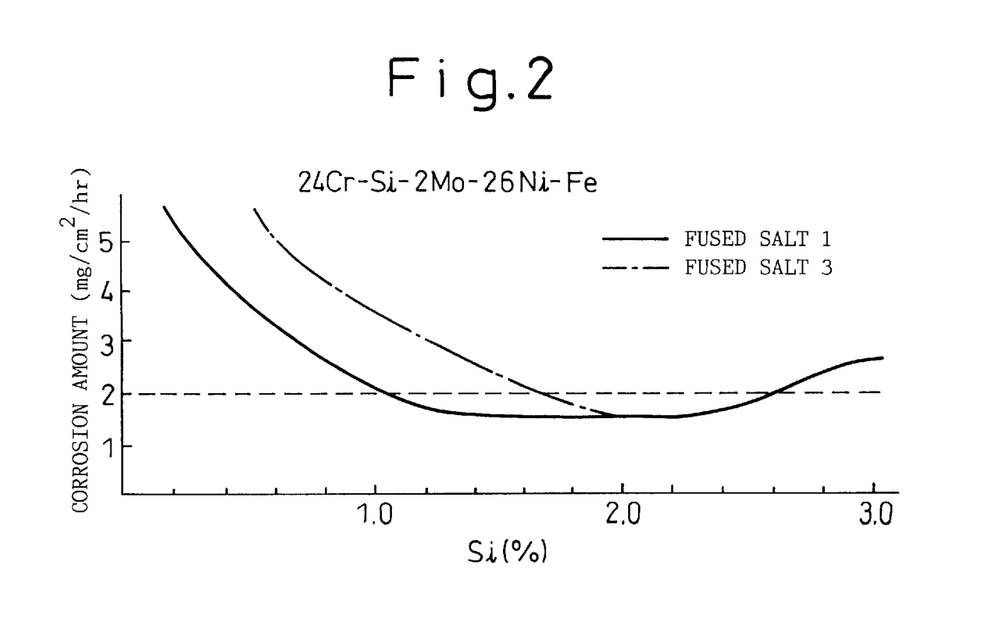
FIG. 2 is a graph showing the influence of the amount of Si on the corrosion amount in a fused scale simulation environment.

In the fused scale simulation environment, Fused Salt 1 composed of 15% NaCl+15% KCl+5% $CaSO_4$+65% $PbCl_2$ was used. Test pieces were coated with Fused Salt 1 to form a coating 1 mm thick, and corrosion tests were conducted by holding the test pieces at 500° C. for 100 hours. FIGS. 1 and 2 show the test results with solid lines.

FIG. 1 shows the influence of a Cr content on a corrosion amount of an alloy which had chemical components composed of Cr—2Si—2Mo—28Ni—Fe. Moreover, FIG. 2 shows the influence of a Si content on a corrosion amount of an alloy which had chemical components composed of 24Cr—Si—2Mo—26Ni—Fe. In addition, the dotted line shows the desirable corrosion limit amount in the environment in which the boiler tubes are used.

It is seen from FIGS. 1 and 2 that the optimum contents of Cr and Si are from 20.0 to 28.0% and 1.0 to 2.6%, respectively in the environment of Fused Salt 1.

Figure 3:
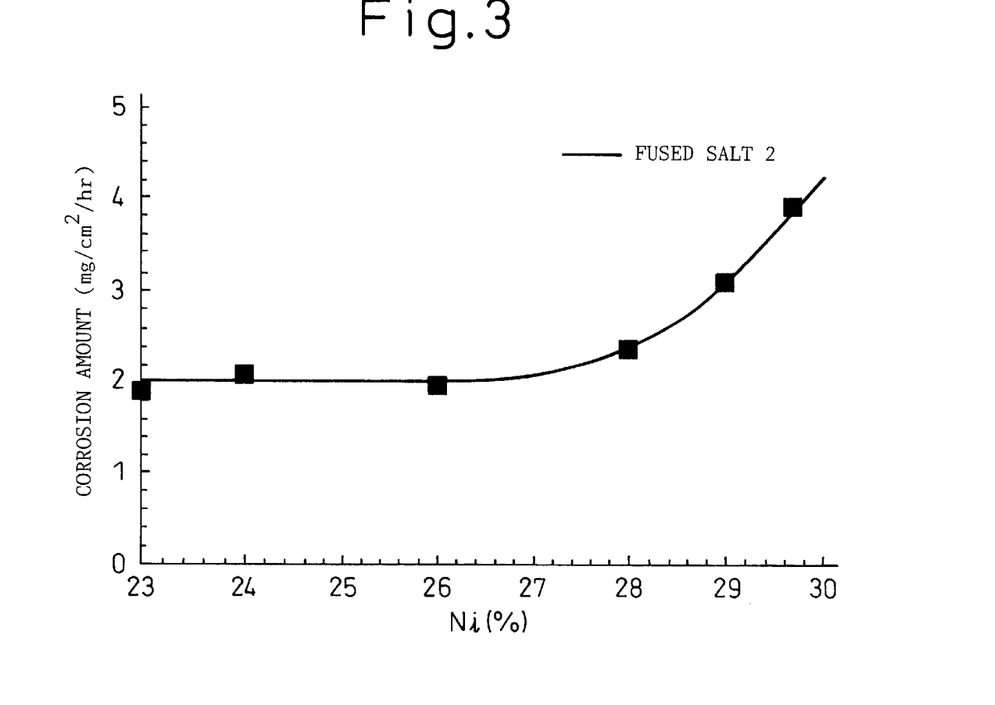
FIG. 3 is a graph showing the influence of the Ni content on the corrosion amount in a fused scale simulation environment.

Corrosion tests were subsequently conducted in the same manner as in the tests mentioned above, using Fused Salt 2 composed of 55% $CaCl_2$+20% NaCl+5% KCl+20% $MgSO_4$ as an environment which simulated fused scale having a relatively high concentration of sulfates. FIG. 3 shows the test results.

FIG. 3 shows an example of the influence of a Ni content on a corrosion amount in fused salts having a slightly high concentration of a sulfate salt. In the examples, alloys containing Cr, Si and Mo constituents satisfying (Cr+2Si+0.5Mo)=27.0(%), and 1.1(Cr+1.5Si+0.5Mo)−8=23.0% were used while the Ni content was varied.

It is understood from the results that those alloys in which the Cr, Si and Mo components are stipulated by the formulas mentioned above show a decreased amount of corrosion caused by a sulfate when the Ni content is at least 23.0% and less than 27.0% and thus show excellent corrosion resistance in fused salts having a slightly high concentration of a sulfate, whereas the alloys show an increased amount of corrosion caused by a sulfate when the Ni content is at least 27.0%.

Next, tests were conducted at 550° C. in the same manner as the corrosion tests mentioned above, using Fused Salt 3 composed of 25% NaCl+25% KCl+25% $Na_2SO_4$+25% $K_2SO_4$ and corresponding to a waste incineration environment which contains about the same amounts of sulfates and chlorides. FIGS. 1 and 2 show the test results with dotted lines.

Figure 4:
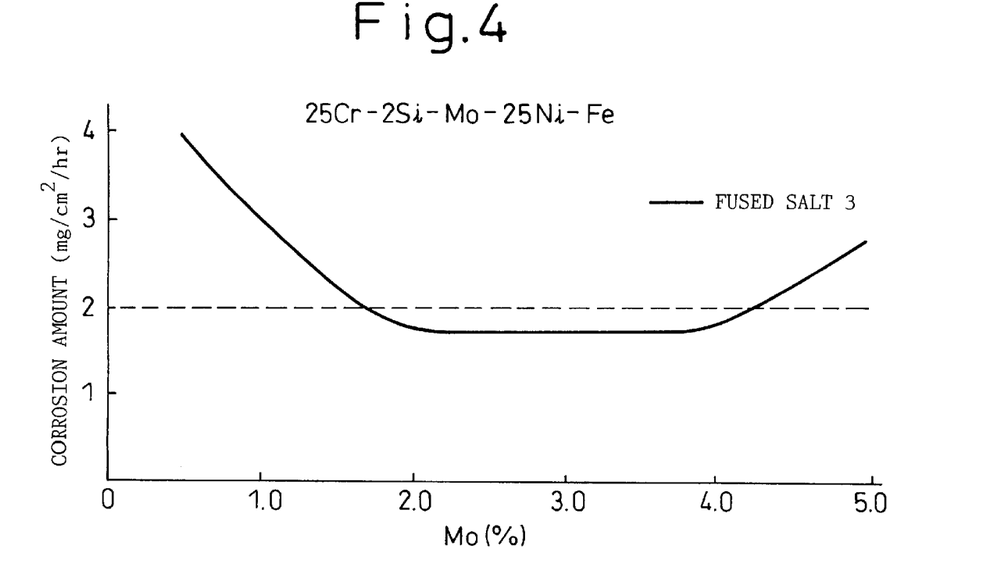
FIG. 4 is a graph showing the influence of the Mo content on the corrosion amount in a fused scale simulation environment.

FIG. 4 shows the influence of Mo on a corrosion amount, and alloys having chemical compositions composed of 25Cr—2Si—Mo—25Ni—Fe were used.

As a result of intensively performing investigations as described above, the present inventors have discovered that a steel having a Cr content of 20.0 to 28.0%, a Si content of 1.0 to 2.6%, a Ni content of 18.0 to 30.0% and a Mo content of up to 4.0% has high corrosion resistance in an environment where sulfates and chlorides coexist.

Furthermore, the present inventors have discovered that a steel having a Cr content of 23.0 to 27.0%, a Si content of 1.6 to 2.2%, a Ni content of 23.0 to 27.0% and a Mo content of 2.0 to 4.0% is more excellent in corrosion resistance, and that the steel has sufficiently high corrosion resistance in a waste incineration environment containing about the same amounts of sulfates and chlorides.

Figure 5:
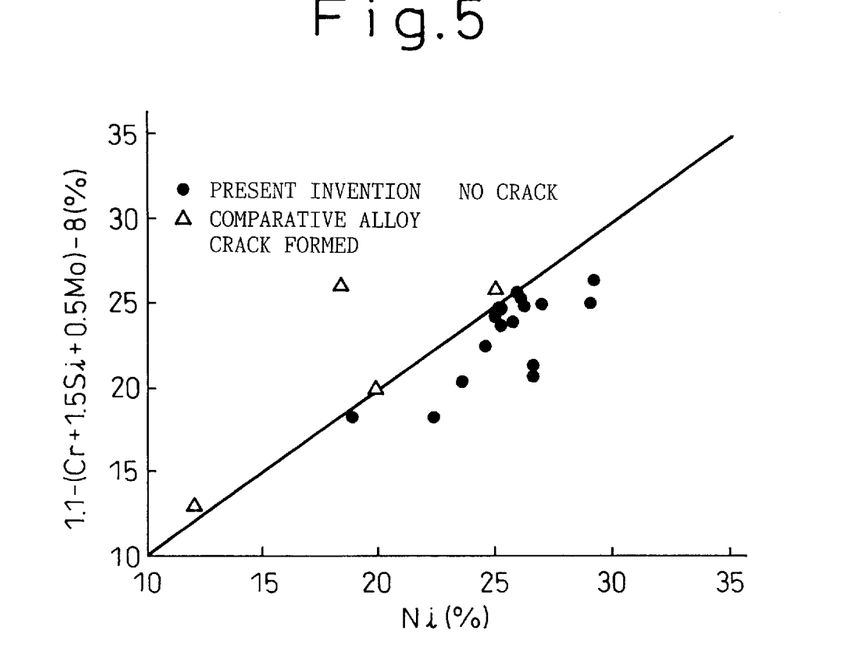
FIG. 5 is a graph showing the influence of the Ni content and the amount of (1.1×(Cr+1.5 Si+0.5 MO)−8) on a flatten-close test.
Figure 6:
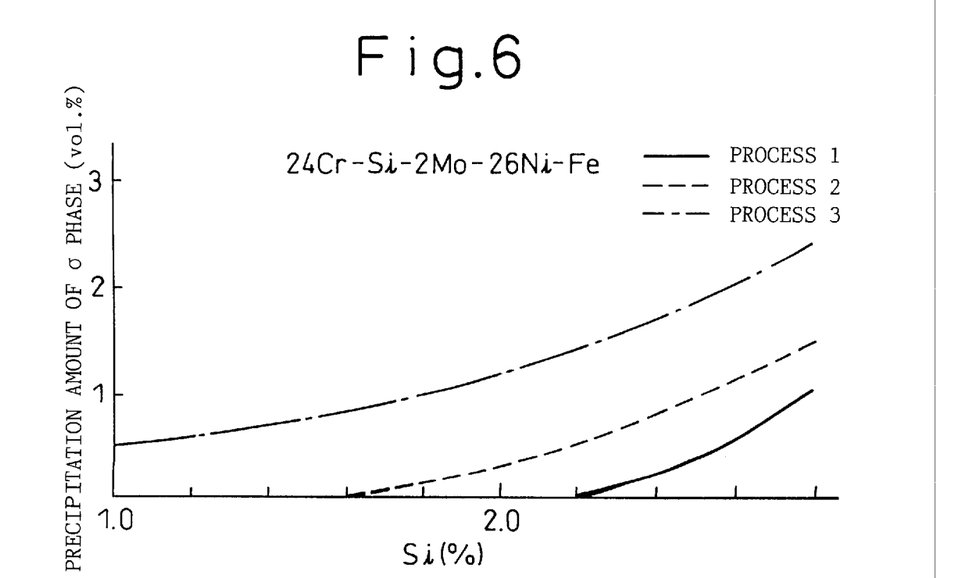
FIG. 6 is a graph showing the relationship between the precipitation amount of the a phase and the Si content under the conditions of respective processes.

When the alloy of the present invention is used as a boiler tube, the alloy is required to inhibit deterioration of cold workability caused by precipitation of δ ferrite and the σ phase in addition to the corrosion resistance as mentioned above. Flatten-close tests in accordance with flatten tests specified by JIS G3463 were conducted to evaluate the cold workability of the alloy. FIGS. 5 and 6 show the test results.

FIG. 5 is a graph showing the influence of a Ni content and an amount represented by the formula (1.1(Cr+1.5Si+0.5Mo)−8) on the results of flatten-close tests. When the alloy contains at least 20% of Cr and at least 1% of Si and has a high Mo content, δ-ferrite is formed to lower the cold workability. However, it has already been known that when Ni≧(Cr+2Si+0.5Mo), cracks are not formed and high cold workability is obtained. Japanese Unexamined Patent Publication (Kokai) No. 7-243007 discloses the matter. The feature of the present invention is as follows: it has been discovered in the subsequent investigation that the alloy can maintain an austenitic structure, does not form cracks and shows high cold workability even when (Cr+2Si+0.5Mo) >Ni≧1.1(Cr+1.5Si+0.5Mo)−8. Moreover, since the amount of Ni which is relatively costly can be decreased in the alloy of the present invention compared with alloys having already been applied, the cost of the alloy is low. Furthermore, the corrosion amount of the alloy of the invention can be suppressed particularly in an environment where the sulfate content is slightly high.

FIG. 6 is a graph showing the relationship between a precipitation amount of the σ phase and a Si content under the conditions of respective production processes. Alloys having chemical components composed of 24Cr—Si—2Mo—26Ni—Fe were used. The conditions (three conditions) of the production processes were as follows: Process 1: a heating temperature of 1,220° C. and an average rate of cooling to 550° C. of 1.3° C./sec; Process 2: a heating temperature of 1,180° C. and an average rate of cooling to 550° C. of 1.3° C./sec; and Process 3: a heating temperature of 1,220° C. and an average rate of cooling to 550° C. of 0.8° C./sec. In addition, cracks were formed during hot extrusion in Process 2. It is seen from FIG. 6 that in the production of a single layer tube by a hot extrusion process, the desirable Si content is up to 2.2%.

When the alloy of the present invention is used as a boiler tube, the tube is naturally required to have a high temperature strength to a certain degree because the tube is a pressure-resistant member. Addition of N is effective in inhibiting the precipitation of the σ phase which causes a drastic strength decrease during use at high temperature.

Figure 7:
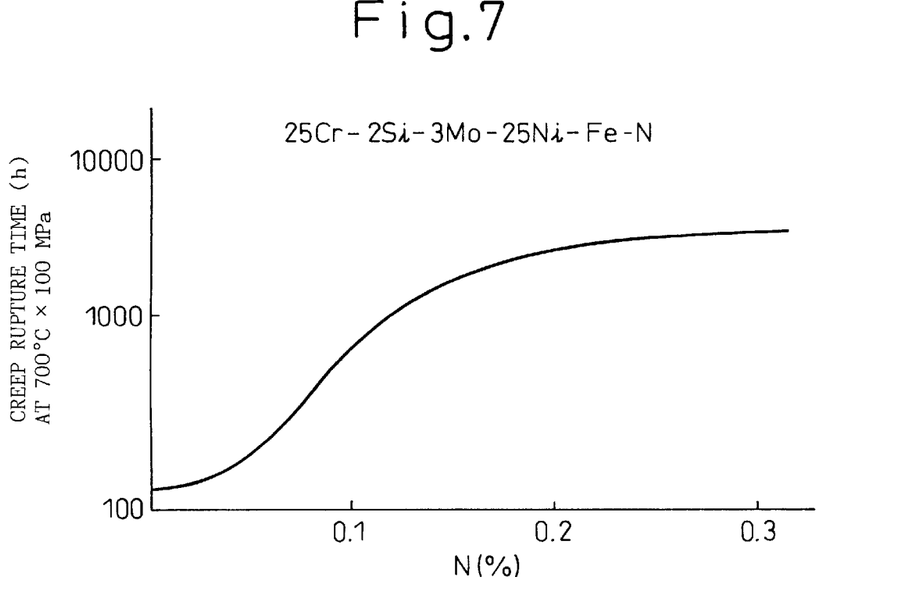
FIG. 7 is a graph showing the relationship between a creep rupture time at 700° C. under a load stress of 100 MPa and the N content.

FIG. 7 is a graph showing the relationship between a creep rupture time at 700° C. under a load stress of 100 MPa and a N content. Alloys having chemical constituents composed of 25Cr—2Si—3Mo—25Ni—Fe—N were used. It is understood from FIG. 7 that the optimum N content is from 0.05 to 0.3%, or that from the standpoint of inhibiting the σ phase the optimum one is from 0.1 to 0.3%.

Figure 8:
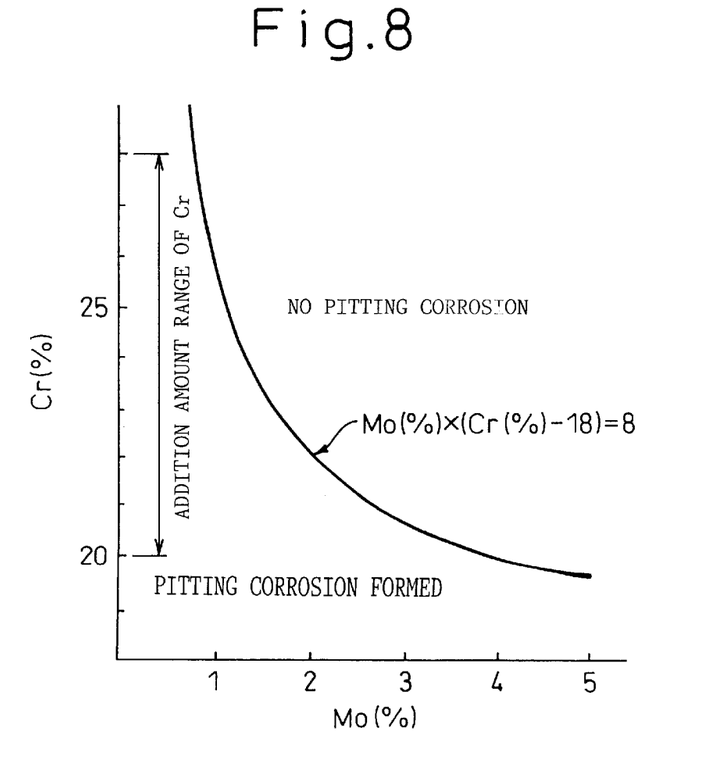
FIG. 8 is a graph showing the effects of Cr and Mo on the inhibition of pitting corrosion in an environment where combustion products are being simulated.

The alloy of the present invention must have resistance to corrosion and pitting corrosion taking place as a result of presence of chlorides in combustion products and an oxidizing environment at the time of stopping combustion of a boiler, etc. Composite addition of Cr and Mo is effective in inhibiting the pitting corrosion. To examine the effects, pitting corrosion tests were conducted in a solution containing 5% of $FeCl_3$ simulating a combustion product. FIG. 8 shows the test results.

FIG. 8 is a graph showing the effects of Cr and Mo on the inhibition of pitting corrosion formation. The corrosion tests were conducted at 40° C. in a solution containing 5% of $FeCl_3$. When the Cr content is from 20.0 to 28.0%, the following conditions must be satisfied to inhibit the pitting corrosion formation: an addition amount of Mo of up to 4%, and $Mo(Cr-18) \geq 8$.

From the results as described above, the range of the chemical constituents of the alloy of the present invention are defined as follows.

C: Carbides are corroded by molten scales to become starting points of extraordinary corrosion. It is particularly necessary to inhibit continuous precipitation of carbides at grain boundaries. Since the Si content of the alloy of the present invention is high, precipitation of the carbides are accelerated. Accordingly, the C content is reduced during the production of the alloy while the upper limit thereof is restricted to 0.05%, and Nb is added, whereby precipitation of the carbides at grain boundaries is inhibited. Since C is an austenite-forming element, it is further desirable that the carbon content be at least 0.02% from the standpoint of inhibiting the precipitation of the σ phase.

Si: Si is an element which forms oxide having low solubilities in molten sulfates and molten chlorides and which improves hot erosion resistance. Si increases the activity of C in the alloy at the same time, and consequently increases precipitation of carbides. Moreover, Si has negative effects of deteriorating the hot erosion resistance by acting as an element which strongly forms ferrite to increase precipitation of δ ferrite and accelerating the precipitation of the σ phase.

As shown by the test results in FIG. 2, the optimum Si content is from 1.0 to 2.6%. It is more desirable that Si be added in an amount of at least 1.6% in an environment equally containing sulfates and chlorides, and that Si be added in an amount exceeding 2.0% when higher corrosion resistance is required. Moreover, when a single layer tube is produced by a hot extrusion process, it is desired that the alloy have an Si content of up to 2.2% to avoid the precipitation of the σ phase during the production as shown by the results in FIG. 6.

Si acts as a deoxidizer during the production of the alloy, and Si is an element which strongly forms ferrite. Accordingly, the Si content is restricted by the following formula in addition to the Si content as mentioned above:

$$Ni \geq 1.1(Cr+1.5Si+0.5Mo)-8$$

Mn: Mn is similar to Si in that Mn must be added as a deoxidizer during the production of the alloy. The deoxidizing effect is lessened when the Mn content is less than 0.02%, and it is saturated when the Mn content exceeds 1.0%. Accordingly, the addition amount is stipulated to be at least 0.02% and up to 1.0%.

Cr: Cr is one of the principal elements for forming a corrosion-resistant oxide film which inhibits extraordinary corrosion caused by formation of low melting point scales. However, Cr is a ferrite-forming element, and forms δ ferrite during the production of the alloy. Moreover, Cr is an element which strongly forms carbides. δ Ferrite causes extraordinary corrosion together with carbides. Consequently, excessive addition of Cr deteriorates the corrosion resistance.

As shown in FIG. 1, the optimum Cr content is from 20.0 to 28.0%. However, a Cr content of at least 23.0% is desirable from the standpoint of improving the corrosion resistance in an environment which equally contains sulfates and chlorides. The content of Cr which is a principal element for forming the σ phase is desirably up to 27.0% from the standpoint of inhibiting the σ phase.

Ni: Ni is an element which forms a corrosion-resistant oxide film together with Cr. However, Ni addition in a large amount exerts adverse effects in an environment where a sulfate concentration in fuel is high. Since Ni is a costly constituent, a necessary minimum amount of Ni for maintaining the austenitic structure is added on condition that Cr and Si are added in amounts of at least 20% and at least 1%, respectively. When Ni is added in an amount of 18.0 to 30.0% while the related formula $Ni \geq 1.1(Cr+1.5Si+0.5Mo)-8$ is being satisfied, cracks are not formed and high cold workability can be obtained. It is desirable that Ni be added in an amount of up to 27.0% from the standpoint of improving the corrosion resistance in an environment equally containing chlorides and sulfates, and that Ni be added in an amount of at least 23% from the standpoint of inhibiting the a phase.

Mo: Composite addition of Cr and Mo is effective for the alloy of the present invention in inhibiting the formation of pitting corrosion caused by chlorides present in combustion products and an oxidizing environment at the time of stopping combustion in a boiler, etc. To achieve the effect, the Mo content must satisfy the following formula as shown in FIG. 5:

Mo(Cr−18)≧8, while Mo is added in an amount of up to 4%.

Furthermore, Mo has effects of promoting dissolution of $Cr_2O_3$ which is a protective scale in a fused sulfate environment on one hand, and inhibiting dissolution of $Cr_2O_3$ in a fused chloride environment on the other hand. Accordingly, addition of Mo in an amount of 2.0 to 4.0% is desirable in an environment equally containing sulfates and chlorides, as shown in FIG. 4.

Nb: Continuous precipitation of Cr carbides at grain boundaries deteriorates the hot corrosion resistance. Since the C content is restricted in the alloy of the present invention, sufficient corrosion resistance can be obtained. Nb is added in a trace amount, and Nb carbonitrides are dispersed and precipitated within the crystal grains. Consequently, formation of Cr carbides are inhibited, and the corrosion resistance is further improved. However, since addition of Nb in a large amount causes precipitation of intermetallic compounds, the hot corrosion resistance is deteriorated, and the alloy is embrittled when used for a long time. When Nb is to be added, it is, therefore, desirable that Nb be added in an amount enough to inhibit the formation of Cr carbides. Since the weight ratio of Nb to C is approximately 8 in the Nb carbide, to obtain excellent corrosion resistance even after the addition of Nb, the addition amount of Nb must be restricted to up to 0.4%, and the Nb content must satisfy the following formula:

Nb≧8C

Al: Al is added as a deoxidizer during the production of the alloy. Since the addition of Al in a large amount embrittles the alloy of the present invention when the alloy is used at high temperature over a long period of time, the addition amount is restricted to up to 0.05%.

N: N is an effective, low cost austenite-stabilizing element. N improves the high temperature strength of the alloy necessary for a boiler tube, and has an effect of inhibiting the precipitation of the σ phase which becomes a cause of a decrease in the strength of the alloy when the alloy is used for a long time.

As shown in FIG. 7, N shows the effect of improving the high temperature strength when N is added in an amount of at least 0.05%. Moreover, addition of N in an amount of at least 0.1% is desirable from the standpoint of inhibiting the σ phase. Excessive addition of N results in precipitation of nitrides in a large amount, which cause extraordinary corrosion. The addition amount is, therefore, restricted to up to 0.3%.

Next, the process for producing a steel tube from the alloy of the present invention will be explained.

A billet of the alloy of the present invention is produced by the conventional melting-casting process of a stainless steel. The billet is used as a material for hot extrusion in an as forged or as cast state. When a single layer tube is to be produced from the alloy to which the addition amount of Si is large, the σ phase may have been precipitated during solidifying the billet or cooling subsequently to forging. Since the σ phase causes crack formation during elongation by hot extrusion, the billet is heated at temperatures of at least 1,200° C. for at least 30 minutes to make the σ phase disappear sufficiently, and immediately hot extruded to prevent reprecipitation. The upper limit of the billet heating temperature is restricted to be 1,250° C. to prevent fused embrittlement. The σ phase may precipitate in the cooling step directly after hot extrusion, and cause crack formation when cold drawing is conducted in the next step. Moreover, the a phase may also cause crack formation during bending even when the as hot extruded product is used. To prevent the precipitation of the σ phase, the hot extruded product is cooled at an average cooling rate of at least 1° C./sec until the temperature reaches 550° C. to form an austenite single phase structure.

The production conditions are based on the results in FIG. 6. That is, FIG. 6 shows the results of investigating the relationship between a Si content and a precipitation amount of the σ phase, for billets produced by the following three processes: Process 1: a billet heating temperature of 1,220° C. and an average rate of cooling to 550° C. of 1.3° C./sec; Process 2: a billet heating temperature of 1,180° C. and an average rate of cooling to 550° C. of 1.3° C./sec; and Process 3: a billet heating temperature of 1,220° C. and an average rate of cooling to 550° C. of 0.8° C./sec. In Process 1, when the billet had a Si content of up to 2.2%, the σ phase did not precipitate, and cracks were not formed. In Process 2, hot extrusion was conducted while the σ phase did not disappear sufficiently due to a low heating temperature of the billet, and consequently cracks were formed during hot extrusion. In Process 3, since the cooling rate was slow, the σ phase precipitated during cooling even when the Si content was about 1.0%. In the present invention, any known procedure can be applied in the cooling step at temperatures of less than 550° C. and in the working step subsequently to hot extrusion. Needless to say, the production process of the present invention is not restricted to the singlelayer tube but it can be applied to the production of a multilayer tube.

Next, the process for producing a multilayer steel tube of the present invention will be explained.

Powder of the alloy of the present invention for an outer tube is press bonded by hydraulic isostatic pressing (HIP) to the surface of a given stainless steel billet for an inner tube produced by a conventional melting-casting process of the stainless steel. The billet for a double layer tube is soaked, and hot extruded to have a given size.

When the material for the outer tube is a plate or tube, in place of the process for press bonding the powder by HIP, the plate having chemical constituents of the outer tube material is wound around the stainless steel billet for the inner tube, or the stainless steel billet is fitted into the outer tube material. The outer tube material and the inner tube material billet are then bonded by welding, and a multilayer steel tube is produced using the billet for a double tube thus produced by the process as mentioned above. When the alloy of the present invention has a high Si content, the alloy shows lowered hot deformability when subjected to conventional hot working. However, the alloy shows no lowered hot deformability during tubing when hot extrusion by HIP is employed.

When the alloy of the present invention is used for the multilayer steel tube, a carbon steel, a low alloy steel or stainless steel specified by JIS G3461, JIS G3462, JIS G3463, etc., and used as a boiler tube is employed as a base layer material, and the alloy of the present invention is used as a liner material for the inner or outer layer to form a multilayer steel tube.

Needless to say, the process for producing the multilayer steel tube of the present invention is not limited to the production process as mentioned above, but other known processes for producing a composite or multilayer steel tube may also be adopted.

The present invention may also be practiced by making a steel tube or a high temperature material with a similar tubular shape such as a nozzle comprising a multilayer object produced by thermal spraying, e.g. LPPS.

EXAMPLES

Corrosion tests and flatten-close tests were conducted on alloys of the present invention and comparative alloys the chemical compositions of which are shown in Table 1. Test materials of alloys having already been proposed and alloys of the present invention (Sample Nos. 1 to 14) were prepared by machining double layer tubes produced by HIP-hot extrusion so that the tubes each had an outer layer having a thickness of 1.5 mm. The alloys of the present invention 15, 16 were prepared by machining plate materials obtained by vacuum melting, hot rolling and carrying out solid solution heat treatment to give sheets each having a thickness of 1.5 mm.

In fused salt corrosion tests, the following fused salt mixtures were employed: a molten salt mixture of 15% NaCl+15% KCl+5% $CaSO_4$+65% $PbCl_2$ (referred to as Fused Salt 1); a fused salt mixture of 55% $CaCl_2$+20% NaCl+5% KCl+20% $MgSO_4$ (referred to as Fused Salt 2); and a fused salt mixture of 25% NaCl+25% KCl+25% $Na_2SO_4$+25% $K_2SO_4$ (referred to as Fused Salt 3). In the corrosion tests, Fused Salts were held at 500° C. (550° C. in the case of Fused Salt 3) for 100 hours, and the corroded amounts were measured. Moreover, pitting corrosion tests were conducted by using a solution containing 5% of $FeCl_3$, holding at 40° C. and observing the sample surfaces. The flatten-close tests were conducted in accordance with the flattening tests specified by JIS G3463.

As shown in Table 1, the alloys of the present invention showed decreased amounts of corrosion regardless of the types of the molten salt mixtures, no pitting corrosion formation, and no crack formation caused by the flatten-close tests. On the other hand, the comparative alloys showed several times as much corrosion amounts caused by the fused salts as those of the alloys of the present invention, pitting corrosion formation and high ratios of crack formation caused by the flatten-close tests compared with the alloys of the present invention.

Using billets having respective chemical compositions of the alloys of the present invention 17 to 26 in Table 1, alloy samples were prepared by the production process of the present invention (heating temperature of billets: 1,220° C., average rate of cooling to 550° C.: 1.3° C./sec, (the process being designated by Process of Invention). Using the same billets as mentioned above, alloy samples were prepared by processes different from that of the present invention (billet heating temperature: 1,180° C., average rate of cooling to 550° C.: 1.3° C./sec (designated by Comparative Process 1); billet heating temperature: 1,220° C., average rate of cooling to 550° C.: 0.8° C./sec: (designated by Comparative Process 2). Flatten-close tests were conducted on as hot extruded alloy samples of these alloy samples.

As shown in Table 2, when the process of the present invention is applied, the alloys of the present invention are prevented from forming cracks during hot extrusion and subsequent cold working.

On the other hand, when the alloys of the present invention are subjected to processes other than the process of the present invention, the alloys may form cracks during hot extrusion or cold working.

TABLE 1-1

| No. | Category | Chemical composition (wt. %) | | | | | | | | |
|---|---|---|---|---|---|---|---|---|---|---|
| | | C | Si | Mn | Cr | Ni | Mo | Nb | Al | N |
| 1 | Alloy of I. | 0.026 | 1.23 | 0.17 | 27.4 | 26.3 | 1.2 | 0.32 | 0.009 | — |
| 2 | Alloy of I. | 0.007 | 1.65 | 0.18 | 26.5 | 28.9 | 2.2 | 0.1 | 0.043 | — |
| 3 | Alloy of I. | 0.04 | 1.82 | 0.17 | 25.1 | 24.9 | 3.1 | 0.35 | 0.011 | — |
| 4 | Alloy of I. | 0.025 | 1.36 | 0.19 | 20.3 | 22.3 | 3.5 | 0.21 | 0.007 | — |
| 5 | Alloy of I. | 0.032 | 2.22 | 0.15 | 21.6 | 26.5 | 3.6 | 0.3 | 0.032 | — |
| 6 | Alloy of I. | 0.008 | 2.22 | 0.22 | 21.4 | 23.5 | 2.4 | — | 0.034 | — |
| 7 | Alloy of I. | 0.031 | 2.22 | 0.31 | 27.3 | 29.1 | 1.5 | — | 0.023 | — |
| 8 | Alloy of I. | 0.029 | 1.25 | 0.92 | 20.2 | 18.8 | 3.7 | — | 0.012 | — |
| 9 | Alloy of I. | 0.009 | 1.81 | 0.75 | 21.6 | 26.5 | 3.6 | 0.28 | 0.032 | — |
| 10 | Alloy of I. | 0.031 | 1.74 | 0.21 | 25.1 | 25.1 | 3.1 | 0.3 | 0.01 | 0.18 |
| 11 | Alloy of I. | 0.029 | 1.76 | 0.34 | 25 | 25.8 | 2.9 | 0.28 | 0.01 | 0.06 |

| No. | Category | Corrosion test (mg/cm$^2$/hr) | | | Pitting corrosion | Flattening close test |
|---|---|---|---|---|---|---|
| | | Fused Salt 1* | Fused Salt 2# | Fused Salt 3+ | | |
| 1 | Alloy of I. | 1.7 | 1.9 | 2.6 | Not formed | No crack |
| 2 | Alloy of I. | 1.6 | 2.1 | 2.2 | Not formed | No crack |
| 3 | Alloy of I. | 1.7 | 1.8 | 1.9 | Not formed | No crack |
| 4 | Alloy of I. | 1.9 | 2.3 | 2.4 | Not formed | No crack |
| 5 | Alloy of I. | 1.8 | 2.1 | 1.8 | Not formed | No crack |
| 6 | Alloy of I. | 1.9 | 2 | 1.8 | Not formed | No crack |
| 7 | Alloy of I. | 1.7 | 2.1 | 1.7 | Not formed | No crack |

TABLE 1-1-continued

| 8 | Alloy of I. | 1.9 | 1.9 | 2.7 | Not formed | No crack |
| 9 | Alloy of I. | 1.8 | 2.2 | 1.9 | Not formed | No crack |
| 10 | Alloy of I. | 1.7 | 1.8 | 2 | Not formed | No crack |
| 11 | Alloy of I. | 1.6 | 2 | 1.9 | Not formed | No crack |

Note:
Alloy of I. = Alloy of Invention
*Fused Salt 1: 15% NaCl + 15% KCl + 5% CaSO$_4$ + 65% PbCl$_2$
Fused Salt 2: 55% CaCl$_2$ +20% NaCl + 5% KCl + 20% MgSO$_4$
+Fused Salt 3: 25% NaCl + 25% KCl + 25% Na$_2$SO$_4$ + 25% K$_2$SO$_4$

TABLE 1-2

| No. | Category | Chemical composition (wt. %) | | | | | | | | |
|---|---|---|---|---|---|---|---|---|---|---|
| | | C | Si | Mn | Cr | Ni | Mo | Nb | Al | N |
| 12 | Alloy of I. | 0.03 | 1.81 | 0.5 | 25 | 25.1 | 3 | — | 0.01 | 0.11 |
| 13 | Alloy of I. | 0.045 | 1.62 | 0.22 | 26.5 | 25.9 | 3.4 | 0.4 | 0.012 | 0.15 |
| 14 | Alloy of I. | 0.021 | 2.16 | 0.53 | 25.3 | 26.1 | 3.2 | — | 0.02 | 0.22 |
| 15 | Alloy of I. | 0.033 | 2.01 | 0.48 | 25.1 | 26.9 | 3.8 | — | 0.013 | 0.2 |
| 16 | Alloy of I. | 0.021 | 1.9 | 0.3 | 24.5 | 25.3 | 2.8 | — | 0.01 | 0.1 |
| 17 | Alloy of I. | 0.025 | 1.81 | 0.43 | 25.1 | 25.1 | 3 | 0.22 | 0.012 | 0.12 |
| 18 | Alloy of I. | 0.029 | 2.05 | 0.51 | 25.1 | 25.2 | 3.2 | — | 0.01 | 0.13 |
| 19 | Alloy of I. | 0.038 | 2.12 | 0.36 | 25.1 | 25.3 | 3.1 | — | 0.013 | 0.26 |
| 20 | Alloy of I. | 0.034 | 1.7 | 0.3 | 23.8 | 24.5 | 2.8 | — | 0.009 | 0.08 |
| 21 | Alloy of I. | 0.04 | 2.05 | 0.46 | 25.2 | 25.1 | 3.1 | — | 0.01 | 0.13 |
| 22 | Comp. Alloy | 0.051 | 0.62 | 1.06 | 16.9 | 12 | 2.2 | — | 0.003 | — |
| 23 | Cosp. Alloy | 0.033 | 0.65 | 0.18 | 20.8 | 27.2 | 3.7 | — | 0.002 | — |
| 24 | Comp. Alloy | 0.028 | 2.8 | 0.56 | 25.6 | 18.3 | 2.6 | 0.22 | 0.006 | — |
| 25 | Comp. Alloy | 0.065 | 0.52 | 1.1 | 24.8 | 19.8 | — | — | 0.006 | — |
| 26 | Comp. Alloy | 0.05 | 2.4 | 0.02 | 20.2 | 25 | — | — | 0.002 | — |
| 27 | Comp. Alloy | 0.03 | 1.3 | 0.2 | 27 | 25.1 | 0.8 | 0.25 | 0.001 | 0.11 |

| No. | Category | Corrosion test (mg/cm$^2$/hr) | | | Pitting corrosion | Flattening close test |
|---|---|---|---|---|---|---|
| | | Fused Salt 1* | Fused Salt 2# | Fused Salt 3+ | | |
| 12 | Alloy of I. | 1.7 | 1.9 | 1.8 | Not formed | No crack |
| 13 | Alloy of I. | 1.6 | 1.9 | 2 | Not formed | No crack |
| 14 | Alloy of I. | 1.7 | 1.9 | 1.7 | Not formed | No crack |
| 15 | Alloy of I. | 1.7 | 2.1 | 1.8 | Not formed | No crack |
| 16 | Alloy of I. | 1.8 | 1.9 | 1.8 | Not formed | No crack |
| 17 | Alloy of I. | 1.7 | 2 | 1.9 | Not formed | No crack |
| 18 | Alloy of I. | 1.7 | 1.9 | 1.8 | Not formed | No crack |
| 19 | Alloy of I. | 1.6 | 1.9 | 1.7 | Not formed | No crack |
| 20 | Alloy of I. | 1.7 | 2 | 2 | Not formed | No crack |
| 21 | Alloy of I. | 1.7 | 1.9 | 1.8 | Not formed | No crack |
| 22 | Comp. Alloy | 8.9 | 12.5 | 11.2 | Formed | No crack |
| 23 | Comp. Alloy | 7.9 | 9.5 | 3.5 | Formed | No crack |
| 24 | Comp. Alloy | 2.1 | 3.6 | 2.4 | Not formed | Crack formed |
| 25 | Comp. Alloy | 4.3 | 4.3 | 5.2 | Formed | No crack |
| 26 | Comp. Alloy | 3.2 | 2.8 | 4.3 | Formed | Crack formed |
| 27 | Comp. Alloy | 2.3 | 2.5 | 3.1 | Not formed | No crack |

Note:
Alloy of I. = Alloy of Invention
*Fused Salt 1: 15% NaCl + 15% KCl + 5% CaSO$_4$ + 65% PbCl$_2$
Fused Salt 2: 55% CaCl$_2$ +20% NaCl + 5% KCl + 20% MgSO$_4$
+Fused Salt 3: 25% NaCl + 25% KCl + 25% Na$_2$SO$_4$ + 25% K$_2$SO$_4$

TABLE 2

| No. | Process of Invention | | Comparative Process 1 during | | Comparative Process 2 during | |
|---|---|---|---|---|---|---|
| | during hot extrusion | flattening close test | hot extrusion | flattening close test | hot extrusion | flattening close test |
| 17 | No crack | No crack | Crack formed | Crack formed | No crack | Crack formed |
| 18 | No crack | No crack | Crack formed | Crack formed | No crack | Crack formed |
| 19 | No crack | No crack | Crack formed | Crack formed | No crack | Crack formed |
| 20 | No crack | No crack | Crack formed | Crack formed | No crack | Crack formed |
| 21 | No crack | No crack | Crack formed | Crack formed | No crack | Crack formed |
| 22 | No crack | No crack | Crack formed | Crack formed | No crack | Crack formed |
| 23 | No crack | No crack | Crack formed | Crack formed | No crack | Crack formed |
| 24 | No crack | No crack | Crack formed | Crack formed | No crack | Crack formed |
| 25 | No crack | No crack | Crack formed | Crack formed | No crack | Crack formed |
| 26 | No crack | No crack | Crack formed | Crack formed | No crack | Crack formed |

Note:
Process of Invention: a billet heating temperature of 1,220° C, an average rate of cooling to 550° C of 13° C/sec
Comparative Process 1: a billet heating temperature of 1,180° C, an average rate of cooling to 550° C of 13° C/sec
Comparative Process 2: a billet heating temperature of 1,220° C, an average rate of cooling to 550° C of 08° C/sec The present invention provides an alloy, a single layer tube and a multilayer tube having excellent corrosion resistance in an environment where fuel of poor quality such as one containing Na, K, S and Cl, and waste such as industrial waste, municipal refuse and sewage sludge are burnt. As a result, the present invention has made it possible to provide a furnace wall tube, a steam superheater tube, and the like having high corrosion resistance in the environment mentioned above.

We claim:

1. An alloy having excellent corrosion resistance in an environment where fuel of poor quality and waste are burnt, the alloy comprising, in terms of weight, up to 0.05% of C, 1.0 to 2.6% of Si, 0.02 to 1.0% of Mn, 20.0 to 28.0% of Cr, 18.0 to 30.0% of Ni, up to 4.0% of Mo, up to 0.05% of Al, 0.05 to 0.30% of N and the balance Fe and unavoidable impurities, and satisfying the following formulas:

$$(Cr+2Si+0.5Mo)>Ni \geq 1.1(Cr+1.5Si+0.5Mo)-8,$$

and $$Mo(Cr-18) \geq 8.$$

2. The alloy according to claim 1 excellent in corrosion resistance in an environment where fuel of poor quality and waste are burnt, wherein the alloy comprises 0.10 to 0.30% of N in terms of weight.

3. The alloy according to claim 1 excellent in corrosion resistance in an environment where fuel of poor quality and waste are burnt, wherein the alloy comprises, in terms of weight, 0.02 to 0.05% of C, 1.60 to 2.2% of Si, 23.0 to 27.0% of Cr, 23.0 to 27.0% of Ni and 2.0 to 4.0% of Mo.

4. The alloy according to claim 1 excellent in corrosion resistance in an environment where fuel of poor quality and waste are burnt, wherein the alloy further comprises up to 0.4% of Nb.

5. A steel tube excellent in corrosion resistance in an environment where fuel of poor quality and waste are burnt, the steel tube comprising the alloy according to claim 1.

6. A multilayer steel tube excellent in corrosion resistance in an environment where fuel of poor quality and waste are burnt, the multilayer steel tube comprising a standardized boiler tube as a base layer material, and an alloy according to claim 1 as an outer layer material.

7. A process for producing a steel tube excellent in corrosion resistance in an environment where fuel of poor quality and waste are burnt, comprising the steps of heating a billet of an alloy according to any one of claims 1 to 4 to temperatures of 1,200 to 1,250° C., elongating the billet by hot extrusion, and cooling the elongated product to 550° C. at a rate of at least 1° C./sec to form an austenite single phase structure.

* * * * *